United States Patent [19]

Sasaki et al.

[11] 4,119,957

[45] Oct. 10, 1978

[54] DIGITAL DISPLAY FOR COOKING TIME AND POWER OF ELECTRIC COOKING DEVICE

[75] Inventors: Masayuki Sasaki, Kawasaki; Motokazu Tamano, Yokohama, both of Japan

[73] Assignee: Tokyo Shibaura Electric Co., Ltd., Tokyo, Japan

[21] Appl. No.: 748,896

[22] Filed: Dec. 9, 1976

[30] Foreign Application Priority Data

Dec. 10, 1975 [JP] Japan ............................... 50-146366

[51] Int. Cl.[2] ............................................... G06F 3/14

[52] U.S. Cl. ............................... 340/337; 340/365 R; 219/453

[58] Field of Search ............................... 340/336-337, 340/365 C, 168 S; 219/453

[56] References Cited

U.S. PATENT DOCUMENTS 3,886,539 5/1975 Gould, Jr. ........................ 340/365 C
3,974,472 8/1976 Gould, Jr. ........................ 340/365 C
4,001,536 1/1977 Eberhardt, Jr. ................. 340/365 C

*Primary Examiner*—Marshall M. Curtis
*Attorney, Agent, or Firm*—Finnegan, Henderson, Farabow & Garrett

[57] ABSTRACT

A digital display apparatus for indicating a cooking time and power of an electric cooking device by means of common digital indicators, wherein a first group of AND gates is connected between a first shift register for storing a cooking time data and digital indicators, and a second group of AND gates is connected between a second shift register for storing a power level setting data and digital indicators. Depression of a function key for use in a cooking time data setting enables the first group of AND gates and disables the second group of AND gates to cause the common digital indicators to indicate the cooking time data stored in the first shift register, and depression of a function key for use in power level data setting enables the second group of AND gates and disables the first group of AND gates to cause the common digital indicators to indicate power level setting data stored in the second shift register.

1 Claim, 4 Drawing Figures

DIGITAL DISPLAY FOR COOKING TIME AND POWER OF ELECTRIC COOKING DEVICE

BACKGROUND OF THE INVENTION

This invention relates to a digital display apparatus for indicating a cooking time and power of an electric cooking device.

In a copending application entitled "DIGITAL CONTROL FOR A COOKING TIME AND POWER OF AN ELECTRIC COOKING DEVICE" Ser. No. 736,356 filed Oct. 27, 1976 and assigned to the same assignee of this application, a cooking time data of an electric cooking device stored in a first shift register and a power setting data stored in a second shift register are displayed by separate digital display means. This type of display apparatus requires excess digital indicators. Generally, there is little need simultaneously to display both cooking time and power of the cooking device. Particularly, the power need not always be displayed but has to be displayed only when a user desires to notice the power of the cooking device.

SUMMARY OF THE INVENTION

It is accordingly the object of this invention to provide a digital display apparatus for indicating a cooking time and power of an electric cooking device which comprises means for selectively indicating the cooking time and power.

According to an aspect of this invention, there is provided a digital display apparatus for indicating a cooking time and power of an electric cooking device comprising a first shift register means for storing a cooking time data; a second shift register for storing a power level setting data of said electric cooking device; a digital display means coupled to the first and second shift register means; a first group of gates coupled between the first shift register means and the digital display means; a second group of gates coupled between the second shift registers means and the digital display means; and means for selectively enabling the first and second groups of gates, thereby causing the digital display means to indicate selectively the cooking time data stored in the first shift register means and the power level setting data stored in the second shift register means.

According to another aspect of the invention, there is provided a digital display apparatus for indicating a cooking time and power of an electric cooking device comprising a first shift register means for storing a cooking time data; a second shift register means for storing a data for setting a power level of the electric cooking device; data entry means, including a timer key and power level key for entering a cooking time data into the first shift register means in response to the depression of the timer key and entering a power level setting data into the second shift register means in response to the depression of the power level key; common digital display means coupled to the first and second shift register means; a first group of gates coupled between the first shift register means and common digital display means; a second group of gates coupled between the second shift register means and common digital display means; and means for enabling the first group of gates and disabling the second group of gates in response to the depression of the timer key to cause the digital display means to indicate the cooking time data stored in the first shift register means and for enabling the second group of gates and disabling the first group of gates in response to the depression of the power level key to cause the digital display means to indicate the power level setting data stored in the second shift register means.

DETAILED DESCRIPTION OF THE PREFERRED EMBODIMENT

Figure 1:
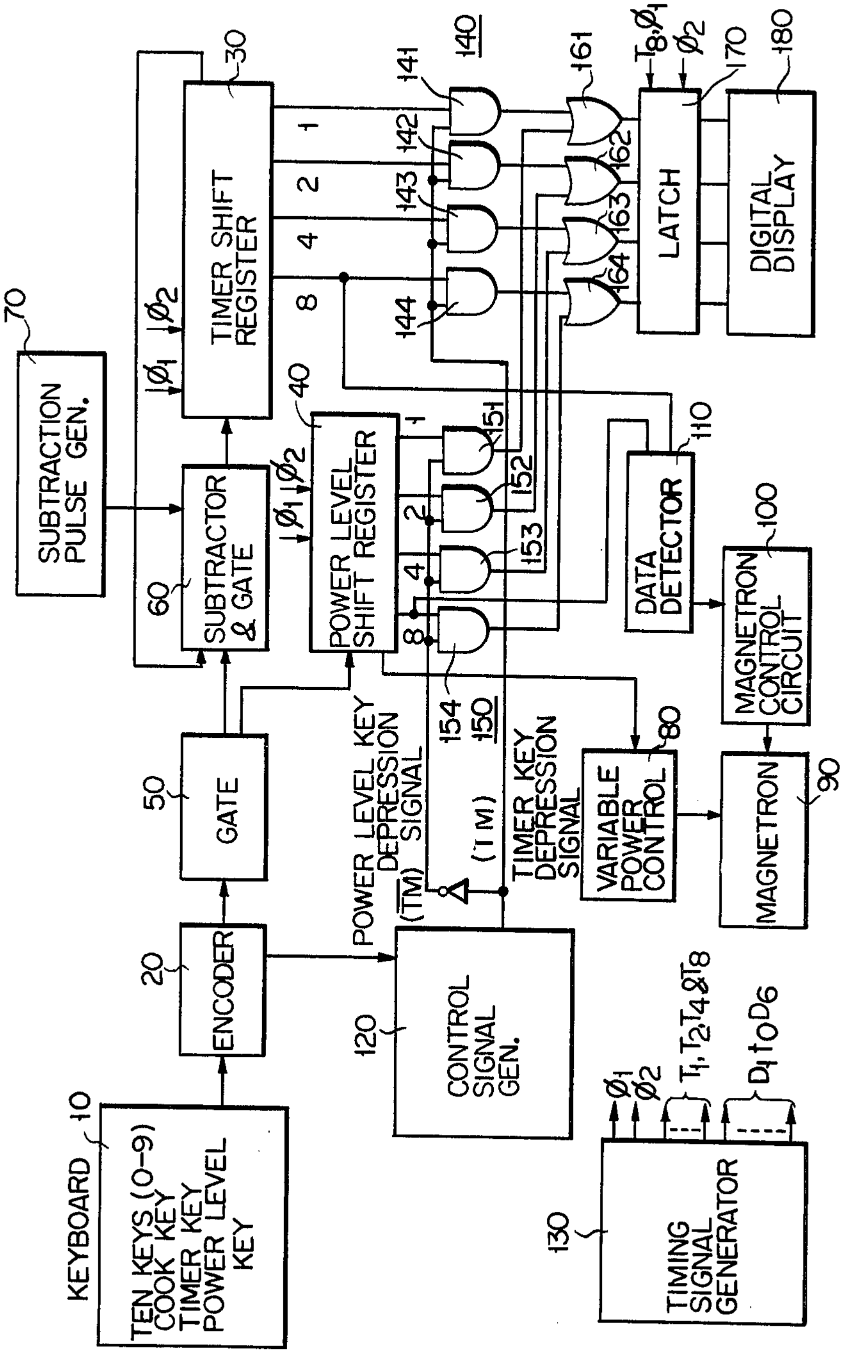
FIG. 1 is a schematic block diagram of an electric cooking device including a digital display system embodying this invention.

FIG. 1 is a schematic block diagram of an electric cooking device provided with a digital display system embodying this invention. Referential numeral 10 denotes a keyboard provided with ten entry keys to which 10 digits of 0 to 9 are allotted, and function keys such as a cook key, timer key and power level key. Upon depression of a key on the keyboard 10, an encoder 20 produces a binary-coded decimal signal corresponding to the depressed key. As described in the aforesaid copending application, the encoder 20 generates a binary-coded decimal signal corresponding to a decimal number allotted to a depressed entry key, and also produces a binary-coded decimal signal corresponding to a larger decimal number than 10 allotted a depressed function key. An output from the encoder 20 upon depression of an entry key is entered through a gate circuit 50 either in a timer shift register 30 or in a power level shift register 40. As set forth in the aforesaid copending application, the gate circuit 50 supplies the timer shift register 30 with a time data formed by entry keys after depression of the timer key, and also supplies the power level shift register 40 with a magnetron power level setting data formed by an entry key, after depression of the power level key.

A subtractor and gate circuit 60 is connected between the gate circuit 50 and the timer shift register 30. The cooking time data stored in the timer shift register 30 circulates through the subtractor and gate circuit 60. The timer shift register 30 has a plurality of digit stages, each storing a decimal number. The subtractor and gate circuit 60 is connected to a subtraction pulse generator 70, which subtracts one second from a time data stored in the timer shift register 30 in response to depression of the cook key on the keyboard 10 and subtraction pulses from the subtraction pulse generator 70. A power level setting data in the power level shift register 40 is delivered to a variable power control 80, thereby controlling an output power of a magnetron 90 to a value corresponding to the power level setting data in the power level shift register 40. A magnetron control circuit 100 causes the magnetron 90 to operate at a power level preset in the power level shift register 40 in response to depression of the cook key after a desired cooking time and a power level other than zero are preset in the timer shift register 30 and power level shift register 40 respectively. At this time, a cooking time stored in the timer shift register 30 begins to be counted down.

When the cooking time stored in the timer shift register 30 is reduced to zero by the down-counting of the subtractor, a circuit 100 for controlling the operation of the magnetron 90 stops the operation by the action of a data detector 110.

Referential numeral 120 is a control signal generator connected to the encoder 20 to generate various control signals upon depression of keys on the keyboard 10. The control signals generator 120 is provided with a flip-flop circuit which is set upon depression of the timer key on the keyboard 10 and generates a timer key depression representative signal (TM) having a logical "1" level. This flip-flop circuit is reset upon depression of the power level key to convert the signal (TM) into a logical "0" level. A referential numeral 130 denotes a timing signal generator for producing clock pulses $\phi_1$, $\phi_2$, bit pulses $T_1$, $T_2$, $T_4$ and $T_8$ and digit pulses $D_1$ to $D_6$. The arrangement and operation of the above-mentioned circuits are already set forth in the aforesaid copending application.

Four bit outputs from one stage of the timer shift register 30 are respectively coupled to the first inputs of four 2-input AND gates 141, 142, 143, 144 constituting a first group 140 of AND gates. Four bit outputs from the power level shift register 40 are respectively coupled to the first inputs of four 2-input AND gates 151, 152, 153, 154 constituting a second group 150 of AND gates. To the second inputs of the AND gates 141 to 144 is coupled the timer key depression representative signal (TM) from the control signal generator 120. To the second inputs of the AND gates 151 to 154 is coupled the power level key depression representative signal $(\overline{TM})$.

A latch circuit 170 is supplied with outputs from the AND gates 141, 151 through an OR gate 161, outputs from the AND gates 142, 152 through an OR gate 162, outputs from the AND gates 143, 153 through an OR gate 163, and outputs from the AND gates 144, 154 through an OR gate 164. The latch circuit 170 is one digit memory which receive a pulse $T_8 \cdot \phi_1$ as a read-in pulse and a clock pulse $\phi_2$ as a readout pulse. Bit outputs of the latch circuit 170 are coupled to a digital display circuit 180.

Figure 2:
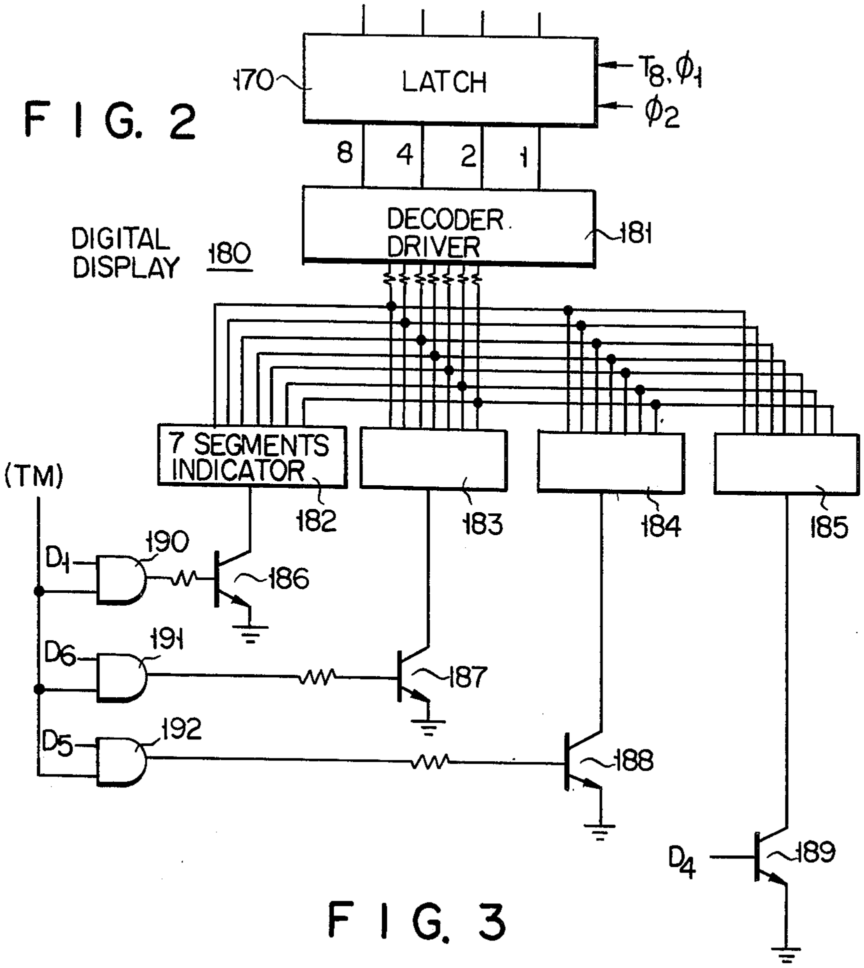
FIG. 2 is a circuit of the digital display circuit of FIG. 1.

As shown in FIG. 2, outputs from the latch circuit 170 are supplied to a decoder driver 181 of the digital display circuit 180. Seven outputs from the decoder driver 181 are sent forth to four 7-segment indicators 182, 183, 184, 185, each comprising light-emitting diodes. The four 7-segment indicators 182 to 185 are grounded through the corresponding transistors 186 to 189. The base of transistor 186 is supplied with an output from an AND gate 190, the first input of which receives the digit pulse $D_1$, and the second input of which receives the timer key depression representative signal (TM). The base of transistor 187 is supplied with an output from an AND gate 191, the first input of which receives the digit pulse $D_6$ and the second input of which receives the timer key depression representative signal (TM). The base of transistor 188 is supplied with an output from an AND gate 192, the first input of which receives the digit pulse $D_5$, and the second input of which receives the timer key depression representative signal (TM). The base of transistor 189 is supplied with the digit pulse $D_4$.

Figure 3:
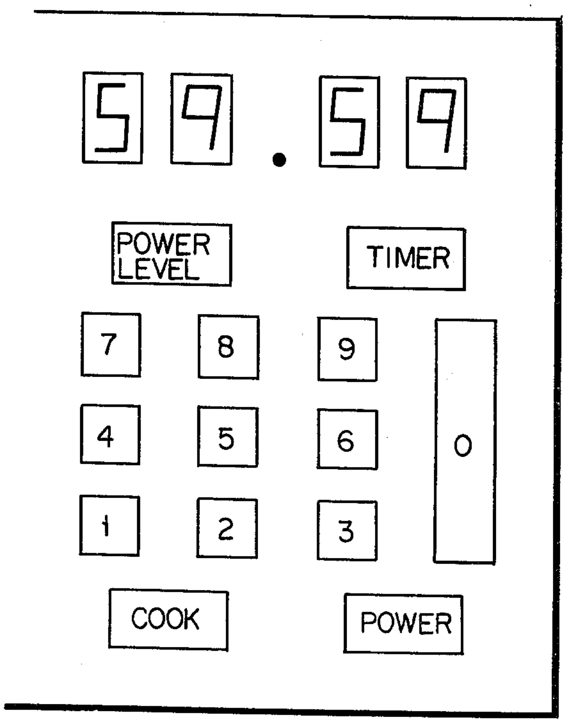
FIG. 3 shows a control panel of an electric cooking device in the cooking time data indication mode.

There will now be described the operation of the digital display system of FIGS. 1 and 2. As described in the aforesaid copending patent application, a data of the 10 minute order stored in the timer shift register 30 appears at the outputs of the latch circuit 170 in a timing in which the digit pulse $D_1$ is issued. The outputs of the latch circuit 170 indicate a data of the 1-minute order in a timing in which the digit pulse $D_6$ is issued, a data of the 10-second order in a timing in which the digit pulse $D_5$ is issued and a data of the 1-second order in a timing in which the digit pulse $D_4$ is issued. The control signal generator 120 produces the timer key depression representative signal (TM) having a logic level of "1" in response to depression of the timer key on the keyboard 10, to enable the AND gates 141 to 144 of the first group 130 of AND gates and disable the AND gates 151 to 154 of the second group 140 of AND gates. Accordingly, bit outputs of the timer shift register 30 are coupled to the latch circuit 170 through the AND gates 141 to 144 and OR gates 161 to 164. The AND gates 190 to 192 are enabled by the timer key depression representative signal (TM). When a data of the 10-minute order appears at the outputs of the latch circuit 170 in a timing in which the digit pulse $D_1$ is issued, then an output of logical "1" level of the AND gate 190 renders the transistor 186 conducting, causing the indicator 182 to display a data of the 10-minute order stored in the timer shift register 30. When a data of the 1-minute order appears at the outputs of the latch circuit 170 in the timing of the digit pulse $D_6$, then an output of logical "1" level from the AND circuit 191 renders the transistor 187 conducting, causing the indicator 183 to display a data of the 1-minute order. When the outputs of the latch circuit 170 produce time data in the timing of the digit pulse $D_5$, then the transistor 188 becomes conductive, causing the indicator 184 to display a data of the 10-second order. When the outputs of the latch circuit 170 generates time data in the timing of the digit pulse $D_4$, then the transistor 189 is rendered conducting, causing the indicator 185 to display a data of the 1-second order. FIG. 3 illustrates the control panel of an electric range, in the cooking time display mode, showing that a cooking time stored in the timer shift register 30 is 59 minutes 59 seconds.

Figure 4:
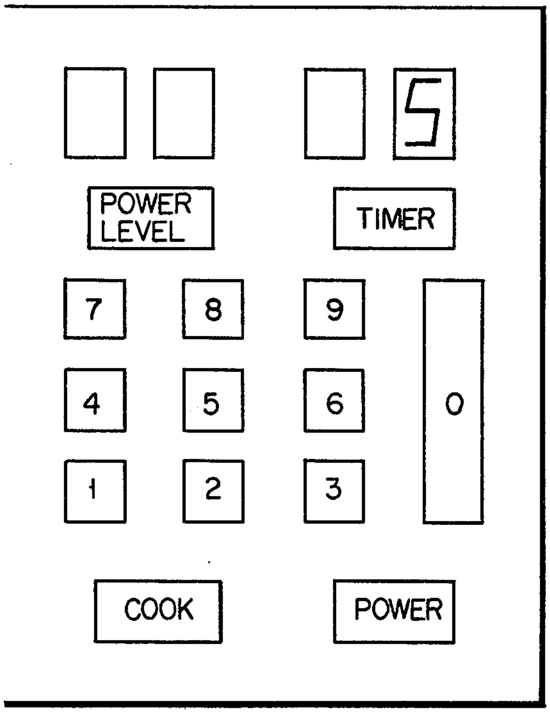
FIG. 4 shows a control panel of the electric cooking device in the power level setting data indication mode.

When the power level key is depressed, then the signal (TM) has its logic level converted into "0", and another signal (TM) has its logic level changed into "1", thereby enabling the AND gates 151 to 154 of the second group 150 and disabling the AND gates 141 to 144 of the first group 140 and the AND gates 190 to 192. As the result, bit outputs of the power level shift register 40 are coupled to the latch circuit 170 through the AND gates 151 to 154 and OR gates 161 to 164. With this embodiment, the power level shift register 40 has only four bit elements. When, therefore, bit outputs of the power shift register 40 are coupled to the latch circuit 170, outputs of the latch circuit 170 do not change in the timing of any digit pulse. Accordingly, in the power level setting data display mode, the transistor 189 is rendered conductive by the digit pulse $D_4$, causing the indicator 185 to display a power level setting data stored in the power level shift register 40. When the power level data is indicated, the AND gates 190 to 192 are rendered nonconducting, preventing the indicators 182 to 184 from being operated. FIG. 4 illustrates the control panel in the power level setting data display mode. FIG. 4 shows that a power level setting data in the power level shift register 40 is 5. In this case, the magnetron is operated at the power corresponding to the power level setting data of 5.

What we claim is:

1. A digital display apparatus for indicating a cooking time and power level of an electric cooking device comprising a first shift circulating register means having a plurality of digit stages for storing a cooking time data; a second shift register means having only four bit elements for storing a data for setting a power level of the electric cooking device; data entry means including digit keys, a timer key and a power level key for entering a cooking time data into the first shift register means in response to the depression of the timer key and subsequently selected digit keys and for entering a power level setting data into the second shift register means in response to the depression of the power level key and a subsequently selected digit key; a four-bit latch circuit; a time-division digital display means coupled to four bit outputs of the latch circuit; a first group of four gates coupled between four bit outputs of a predetermined digit stage of the first shift register means and four bit inputs of the latch circuit; a second group of four gates coupled between four bit outputs of the second shift register means and the four bit inputs of the latch circuit; and means for enabling the first group of gates and disabling the second group of gates in response to the depression of the timer key to cause the time-division digital display means to indicate the cooking time data stored in the first shift register means and for enabling the second group of gates and disabling the first group of gates in response to the depression of the power level key to cause the time-division digital display means to indicate the power level setting data stored in the second shift register means.

* * * * *